(12) United States Patent
Ring et al.

(10) Patent No.: US 6,419,061 B1
(45) Date of Patent: Jul. 16, 2002

(54) ANTI-BACKLASH MECHANISM

(75) Inventors: Michael E. Ring, Crown Point, IN (US); Scott L. Natschke, Kankakee, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/664,140

(22) Filed: Sep. 15, 2000

(51) Int. Cl.[7] .................. F16D 41/064; F16H 55/17
(52) U.S. Cl. .................. 192/45; 74/445; 188/82.84
(58) Field of Search ............... 74/445; 188/82.84; 192/45

(56) References Cited

U.S. PATENT DOCUMENTS

| | | | | |
|---|---|---|---|---|
| 846,549 A | * | 3/1907 | Clark | 74/445 X |
| 1,247,922 A | * | 11/1917 | Battle | 74/445 X |
| 1,456,700 A | * | 5/1923 | Luhr | 74/445 X |
| 1,520,625 A | * | 12/1924 | Wigley | 74/445 X |
| 1,662,026 A | * | 3/1928 | Brophy | 74/445 |
| 1,835,345 A | * | 12/1931 | Sharp | 74/445 |
| 1,852,957 A | * | 4/1932 | Dalton et al. | 74/445 |
| 2,228,828 A | * | 1/1941 | Imai | 74/443 |
| 2,300,223 A | * | 10/1942 | Hottenroth, Jr. | 192/45 |
| 2,516,365 A | * | 7/1950 | Carraher | 74/445 |
| 2,709,375 A | * | 5/1955 | Sandberg | 74/445 |
| 3,783,712 A | * | 1/1974 | Colinet | 475/168 |
| 4,368,648 A | | 1/1983 | Housman et al. | 74/505 |
| 4,630,498 A | * | 12/1986 | Santi | 74/445 |
| 5,337,626 A | * | 8/1994 | Everts et al. | 74/445 |

* cited by examiner

*Primary Examiner*—Allan D. Herrmann
(74) *Attorney, Agent, or Firm*—James Ray & Associates

(57) ABSTRACT

A fabricated gear is provided which is formed from a plurality of plates disposed in series one on top of another. Each of the plates include a plurality of teeth along an outer circumference thereof. An aperture extending through a center portion of each of the plates is provided. This aperture forms an inner circumference within each of the plates and is capable of receiving a shaft member therethrough. The plates are secured together to form the fabricated gear. This fabricated gear may be keyed onto a shaft member. Alternatively, an anti-backlash mechanism may be provided in the fabricated gear to achieve one direction rotation of a shaft member in a manner similar to a pawl and ratchet mechanism. This anti-backlash mechanism is formed by providing at least one indentation within an inner circumference of at least some of the plates which cooperates with a cylindrical member positioned within an opening formed by this indentation. This cylindrical member is capable of interacting with the at least one opening to cause the plates to lock up onto the shaft member upon the application of a force in a first direction and to freely rotate with respect to the shaft member upon the application of a force in a second direction.

18 Claims, 6 Drawing Sheets

US 6,419,061 B1

ANTI-BACKLASH MECHANISM

FIELD OF THE INVENTION

The present invention relates, in general, to a fabricated gear and, more particularly, to a fabricated gear including anti-backlash mechanism. The fabricated gear of the invention may be used to replace currently used ratchet and pawl mechanisms in hand brakes for railway vehicles. The fabricated gear of the invention may also be used as a slipping clutch mechanism in an automatic set/release hand brake for a railway vehicle.

RELATED ART OF THE INVENTION

Mechanical devices which allow for one direction rotation of a shaft member are well known. These devices are typically referred to as ratchet and pawl mechanisms. A ratchet is usually a plate shaped member or wheel with slanting teeth along an outer circumference thereof. The pawl is a lever which is positioned tangential to the ratchet with one end resting on one of the teeth. When the ratchet rotates in one direction, the pawl slides over the teeth. When the ratchet rotates in the opposite direction, the pawl catches in the teeth, thus preventing rotation of the shaft member in this opposite direction. A well known use for a ratchet and pawl mechanism is in a hand brake for a railway vehicle.

As is generally well known in the railway industry, when railway cars are taken out of a train and parked at a siding or yard, the hand brake or parking brake on at least some of these cars is applied as a precaution against unwanted or unexpected movement of the cars. A typical railway car hand brake system as disclosed in U.S. Pat. No. 4,368,648 and as shown in FIG. 8, normally consists of an apparatus for manually applying and biasing one or more brake shoes against the tread of one or more wheels of the railway car be either turning a hand wheel 4 or pumping a ratchet handle on a hand brake mechanism attached to the railway car.

The hand brake mechanism is usually either a cast or stamped metal gear housing/back plate assembly which is attached to an outside end wall of the railway car. A rotatable chain drum 10 is provided therein which can be rotated by turning hand wheel 4. This rotation is transmitted directly through a drive shaft 5, a pinion 8, a gear 9, and a chain drum 10 to wind a brake chain 17 onto the chain drum 10. The other end of the brake chain normally extends through the bottom of the gear housing and is interconnected with cable or other linkage to the brake rigging (not shown) so as to draw the interconnected brake shoes against the tread surfaces of adjacent railway car wheels and, accordingly, apply the hand brake as intended.

When resistance is offered by the chain 17 to further rotation of the hand wheel 4, such resistance, acting back through the drum 10, the gear 9, and pinion 8, causes a nut to move against a ratchet member 27 which is clamped between respective friction surfaces on the nut and on the drive shaft 5, thus causing the drive shaft 5, ratchet 27, and the nut to rotate as a unit. A pawl 34 prevents rotation of the ratchet 27 in the opposite direction. The hand wheel torque is increased until a state of static equilibrium is reached, or at a point at which the brakes are fully applied, whereupon rotation of the hand wheel 4 is terminated, and the clamped ratchet 27, by means of the holding pawl 34, prevents the chain 17 from unwinding.

A gradual release of the brakes may be performed by rotating the hand wheel 4 in an opposite direction, such as in a counterclockwise direction, which partially loosens the nut to reduce the clamping force on the ratchet 27. This action allows the pinion 8 and gear 9 to rotate to reduce chain load and release the brakes.

Alternatively, a quick release of the brakes may be performed by rotating a quick release handle 32 in a clockwise direction. Generally these quick release mechanisms include a releasable connecting means between the hand wheel shaft and the gear train. When the connecting means is released, the gears of the gear train rotate rapidly, without constraint by the pawl and ratchet wheel, but the hand wheel remains stationary.

Typically gears such as those used in ratchet and pawl systems are formed from a casting process. During this process, care must be taken in order to ensure that proper tolerances are met and a significant amount of machining is often required. Additionally, trapping of any impurities within the casting must be avoided as such could cause the gear to break. Thus, there is a need in the art for a fabricated gear which can overcome the aforementioned disadvantages of a cast gear. There is also a need in the art for a fabricated gear having an anti-backlash mechanism which may be used as a replacement for currently used pawl and ratchet mechanisms in hand brake assemblies.

The fabricated gear having an anti-backlash mechanism of the present invention has been disclosed as one of the components of an automatic set/release hand brake for a railway vehicle in co-pending application Ser. No. 09/507,227, entitled "Automatic Application Hand Brake". The disclosure of this application is hereby incorporated by reference thereto. This co-pending application was filed by the assignee of the present invention. In this co-pending application, the particulars of the fabricated gear having the anti-backlash mechanism were not disclosed nor were they claimed.

SUMMARY OF THE INVENTION

Briefly, the fabricated gear of the invention comprises a plurality of plates disposed in series one on top of another. Each of the plates include a plurality of teeth along an outer circumference thereof. An aperture extending through a center portion of each of the plates is provided. This aperture forms an inner circumference within each of the plates and is capable of receiving a shaft member therethrough. A means for securing said plates together is provided so as to form the fabricated gear. This fabricated gear may be keyed onto a shaft member.

Alternatively, an anti-backlash mechanism may be provided in the fabricated gear to achieve one direction rotation of a shaft member. This anti-backlash mechanism is formed by providing at least one indentation within an inner circumference of at least some of the plates. This inner circumference in the plates is formed by the aperture extending through the plates. This at least one indentation is capable of forming an opening between the inner circumference of the plate and an outer surface of the shaft member. A cylindrical member is provided which is capable of interacting with the at least one opening to cause the plates to lock up onto the shaft member upon the application of a force in a first direction and to freely rotate with respect to the shaft member upon the application of a force in a second direction.

OBJECTS OF THE INVENTION

It is, therefore, a primary object of the invention to produce a fabricated gear that is economically manufactured and operates in a simple manner.

It is another object to produce a fabricated gear which overcomes the disadvantages of cast gears which require extensive machining to achieve close tolerances.

It is still a further object to produce a fabricated gear which is stronger than cast gears.

It is yet another object to provide a fabricated gear having an anti-backlash mechanism which may be used to replace currently used ratchet and pawl mechanisms.

It is still yet another object to provide a fabricated gear having an anti-backlash mechanism which may be used as a slipping clutch mechanism within an automatic set/release hand brake for a railway vehicle.

In addition to the several objects and advantages of the present invention generally described above, various other objects and advantages of the invention will become much more readily apparent to those persons who are skilled in the relevant art from the following more detailed description, particularly, when such detailed description is taken in conjunction with the attached drawing figures and the claims appended hereto.

DETAILED DESCRIPTION OF THE INVENTION

Figure 1:
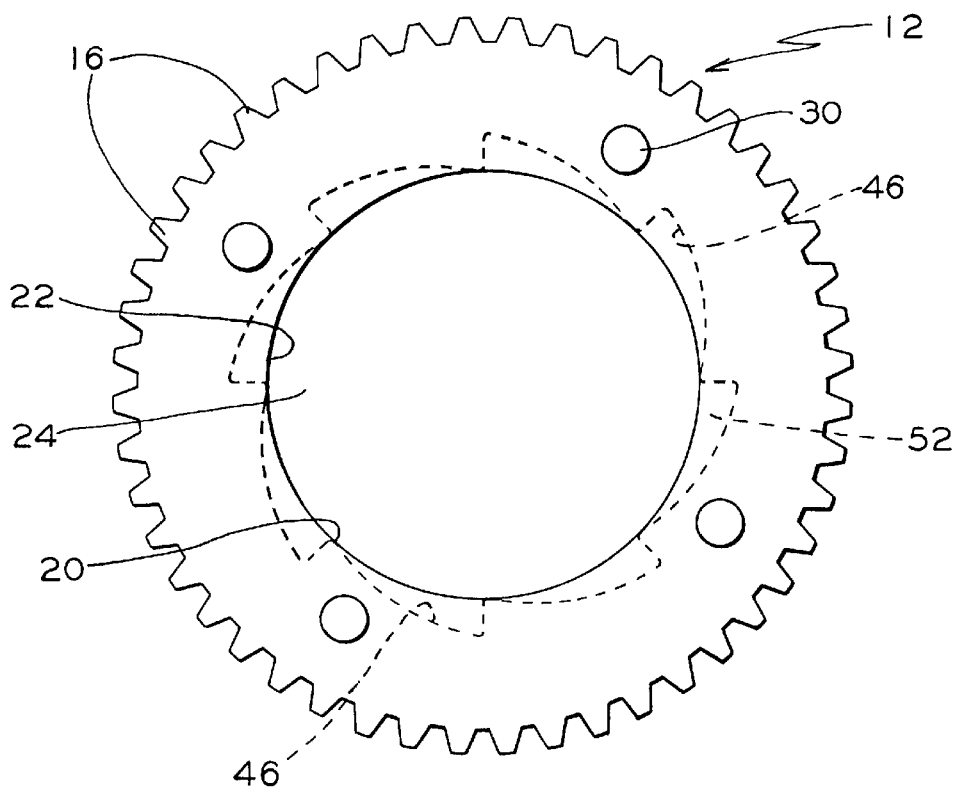
FIG. 1 is an exploded view of the fabricated gear of the invention.

Before describing the invention in detail, the reader is advised that, for the sake of clarity and understanding, identical components having identical functions have been marked where possible with the same reference numerals in each of the Figures provided in this document.

Figure 2:
FIG. 2 is a side view of the fabricated gear of the invention.
Figure 3:
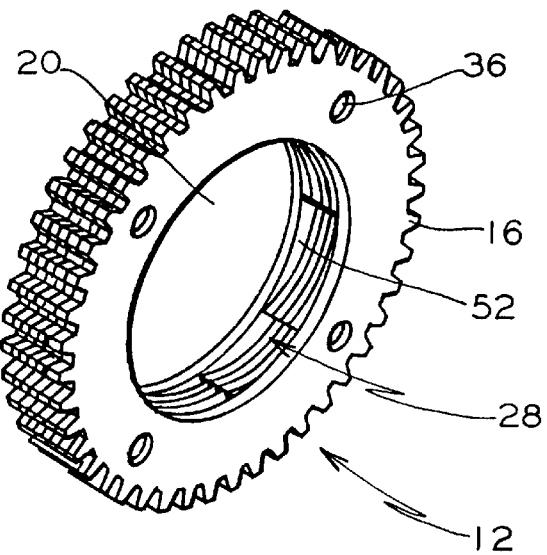
FIG. 3 is an elevated view of the fabricated gear of the invention.

Now referring to FIGS. 1–3, the fabricated gear, generally designated as 12, comprises a plurality of plates 14 disposed in series one on top of another. Each of the plates 14 include a plurality of teeth 16 along an outer circumference thereof. An aperture 20 extending through a center portion of each of the plates 14 is provided. This aperture 20 forms an inner circumference 22 within each of the plates 14 and is capable of receiving a shaft member 24 therethrough. A means for securing the plates together is provided so as to form the fabricated gear. This means for securing the plates together may comprise an adhesive, bonding, or brazing material, generally indicated as 28 as shown in FIG. 3, or a mechanical securing means, such as a bolt or flat head rivet 30. Also, as shown in FIG. 3, openings 36 may be provided in the plates so as to reduce the weight of the fabricated gear.

Figure 5:
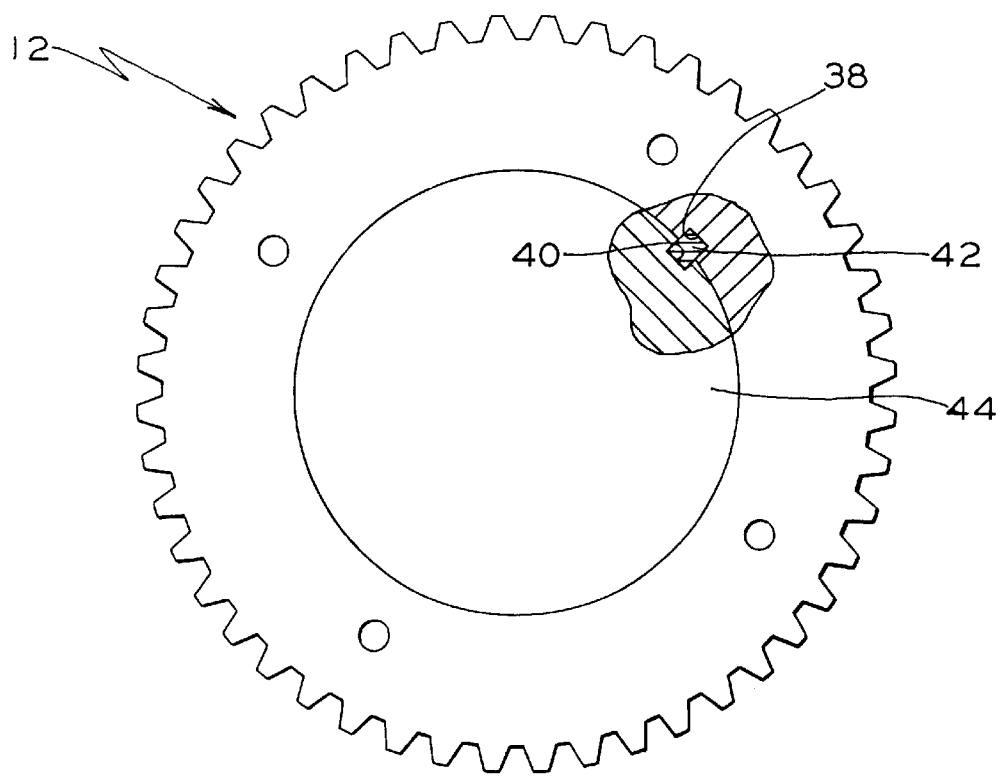
FIG. 5 is an exploded end view of the fabricated gear of the invention keyed onto a shaft member.

As illustrated in FIG. 5, this fabricated gear may be keyed onto a shaft member 44 by providing a key way 38 in each of the plates 14. A corresponding key way 40 is provided in the shaft member 44. The key way 38 in the plates is capable of being positioned in alignment with the key way 40 in the shaft member 44 and is capable of receiving a key 42 therein in order to cause the shaft member 44 to rotate in response to a rotational force applied to the fabricated gear 12.

Figure 4A:
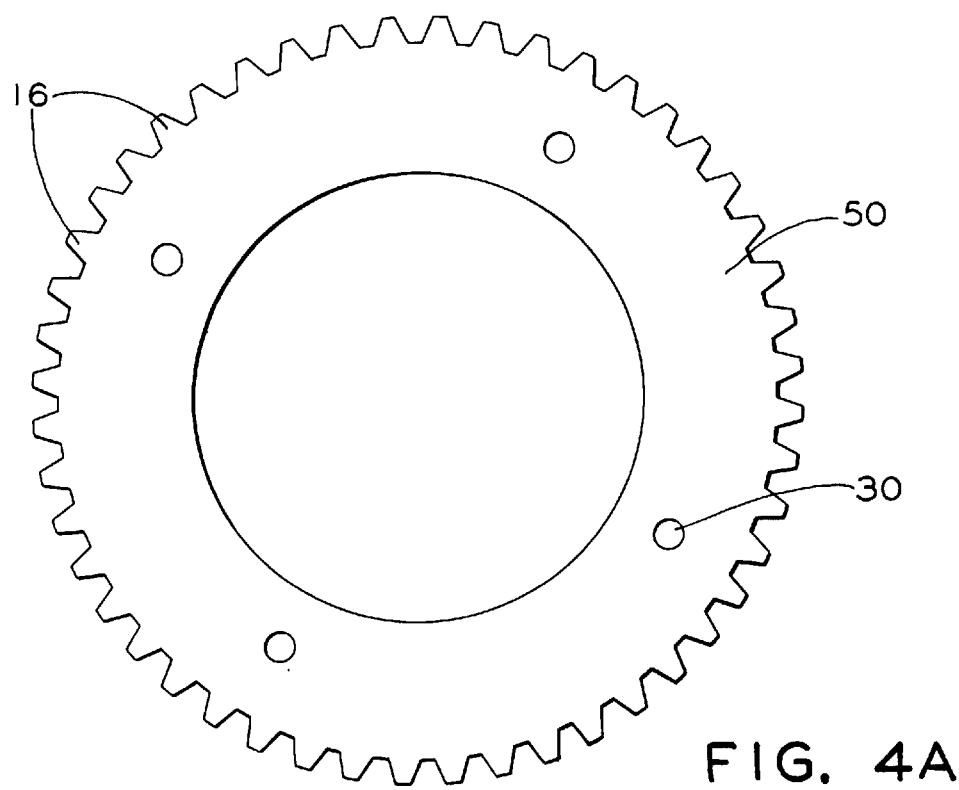
FIG. 4A is an exploded view of an end gear for use in the fabricated gear of the invention.
Figure 4B:
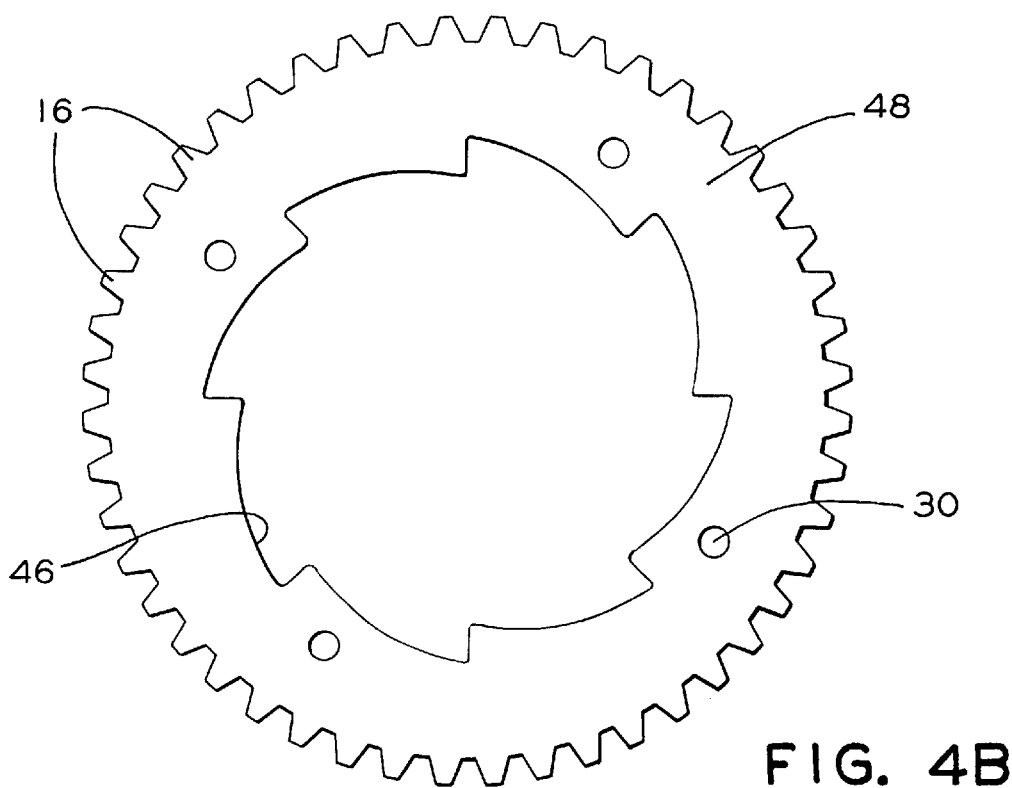
FIG. 4B is an exploded view of an inside gear for use in the fabricated gear of the invention.
Figure 6:
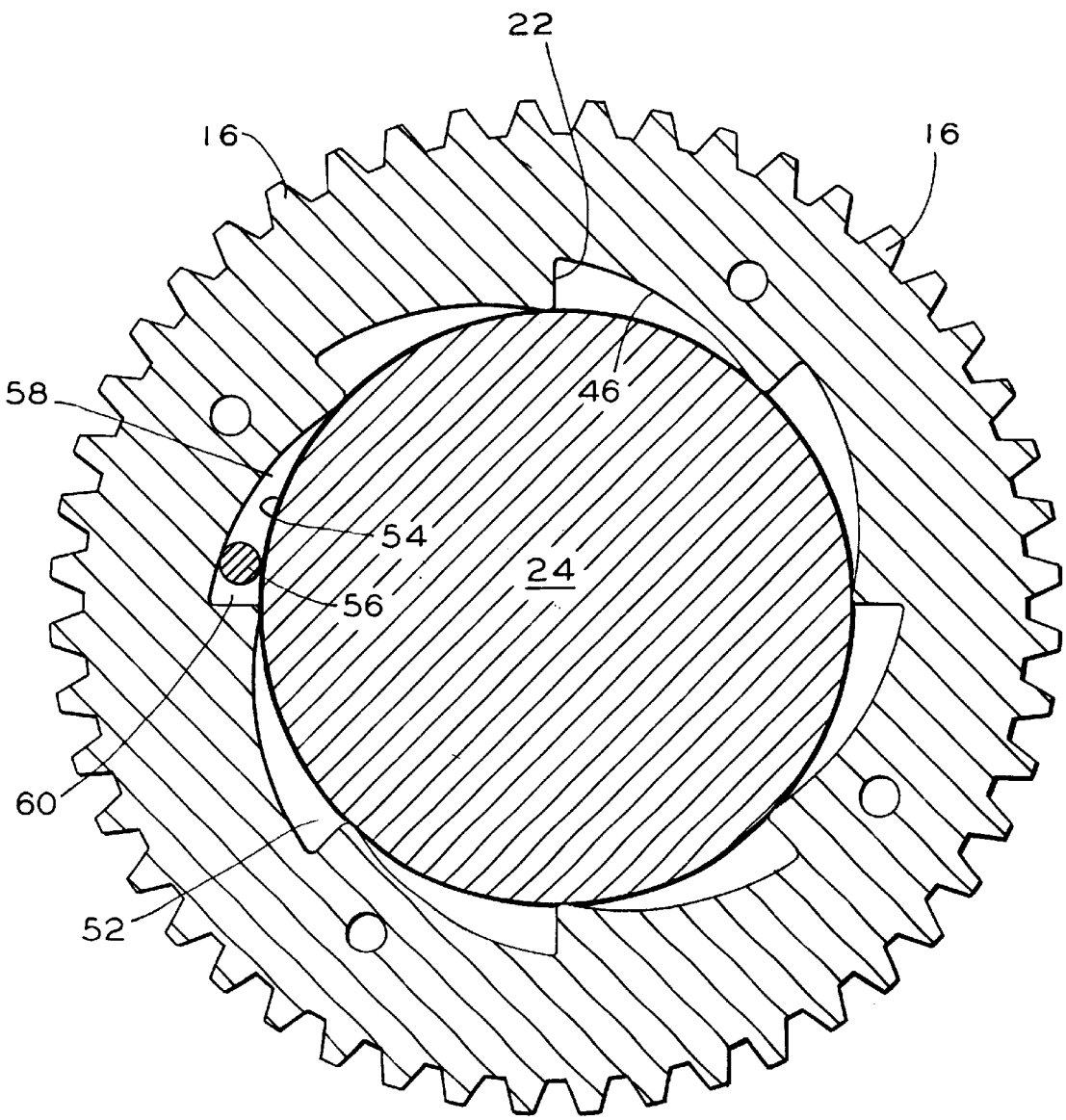
FIG. 6 is an exploded view of inventive fabricated gear including the anti-backlash mechanism.

As stated above, the fabricated gear of the invention includes a plurality of plates 14. Particularly, the invention comprises two end gear plates 50, as illustrated in FIG. 4A, and a plurality, typically four, inside gear plates 48, as illustrated in FIG. 4B. These inside gear plates 48 may or may not include indentations 46 along an inner circumference 22.

An anti-backlash mechanism as illustrated in FIGS. 1–3 and 6 includes at least one indentation 46, preferably a plurality of indentations, within the inner circumference 22 of at least some of the plates 14. Particularly, the indentations 46 are provided on the inner circumference 22 of the inside gear plate 48, as shown in FIG. 4B. The at least one indentation 46 is capable of forming an opening 52 between the inner circumference 22 of the plate 48 and an outer surface 54 of the shaft member 24.

A cylindrical member 56 is provided which is capable of interacting with the at least one opening 52 to cause the plates 14 to lock up onto the shaft member 24 upon the application of a force in a first direction and to freely rotate with respect to the shaft member 24 upon the application of a force in a second direction.

This one way rotation is achieved through the use of an opening 52 which has a first portion 58 having a first predetermined size and a second portion 60 having a second predetermined size which is greater than said first predetermined size. The first portion 58 of the opening is smaller in width than the diameter of the cylindrical member 56 such that upon application of the force in the first direction to the plate members 14, the cylindrical member 56 becomes locked within the first portion 58 of the opening to cause the shaft member 24 to rotate. The second portion 60 of the opening is greater in width than the diameter of the cylindrical member 56 such that upon application of the force in the second direction to the plate members 14, the cylindrical member freely rotates within this second portion 60 of the opening to cause the plate members 14 to freely rotate with respect to the shaft member 24.

Figure 7:
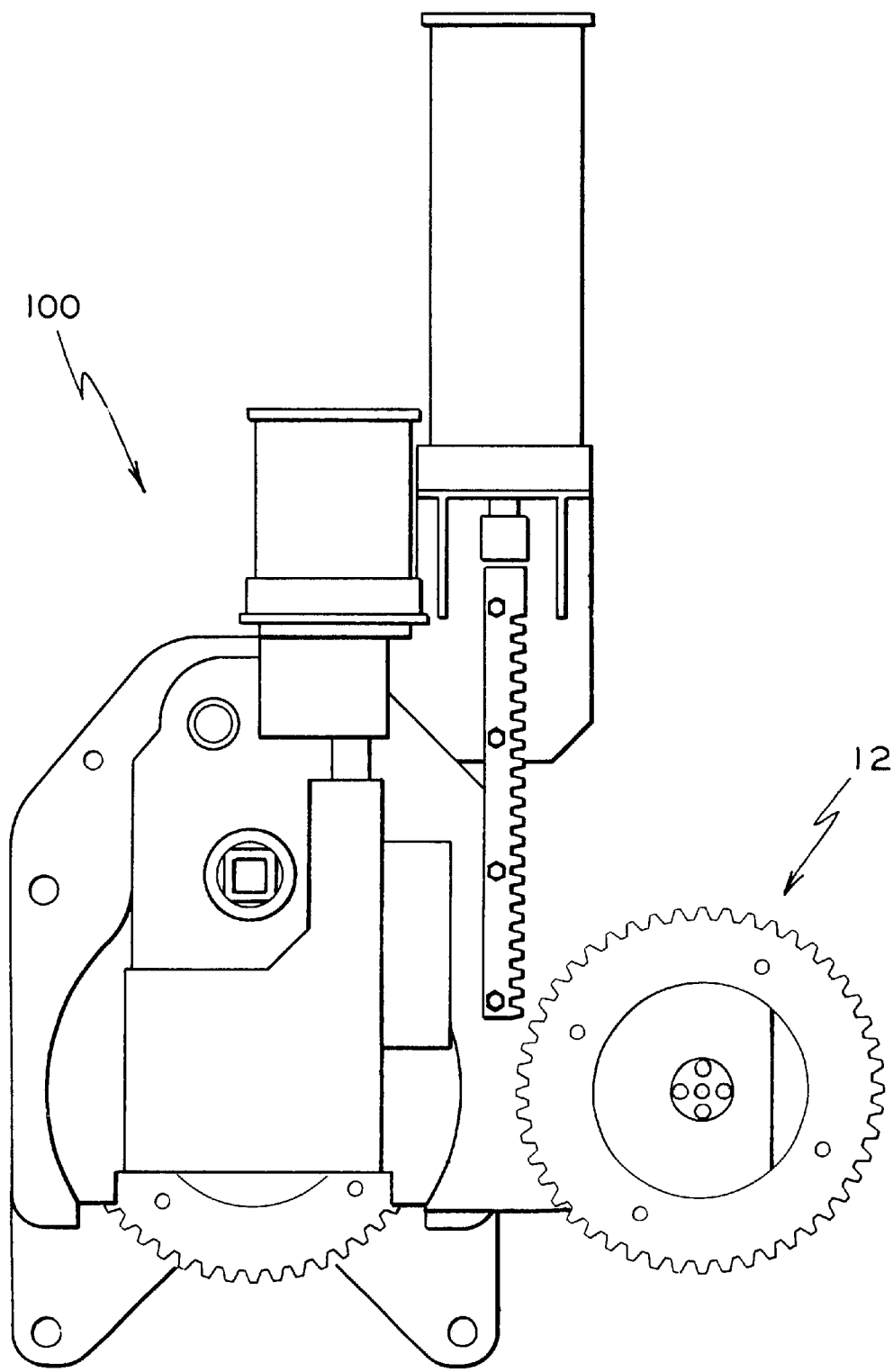
FIG. 7 is a front elevation view of one type of a hand brake assembly incorporating the fabricated gear of the invention.
Figure 8:
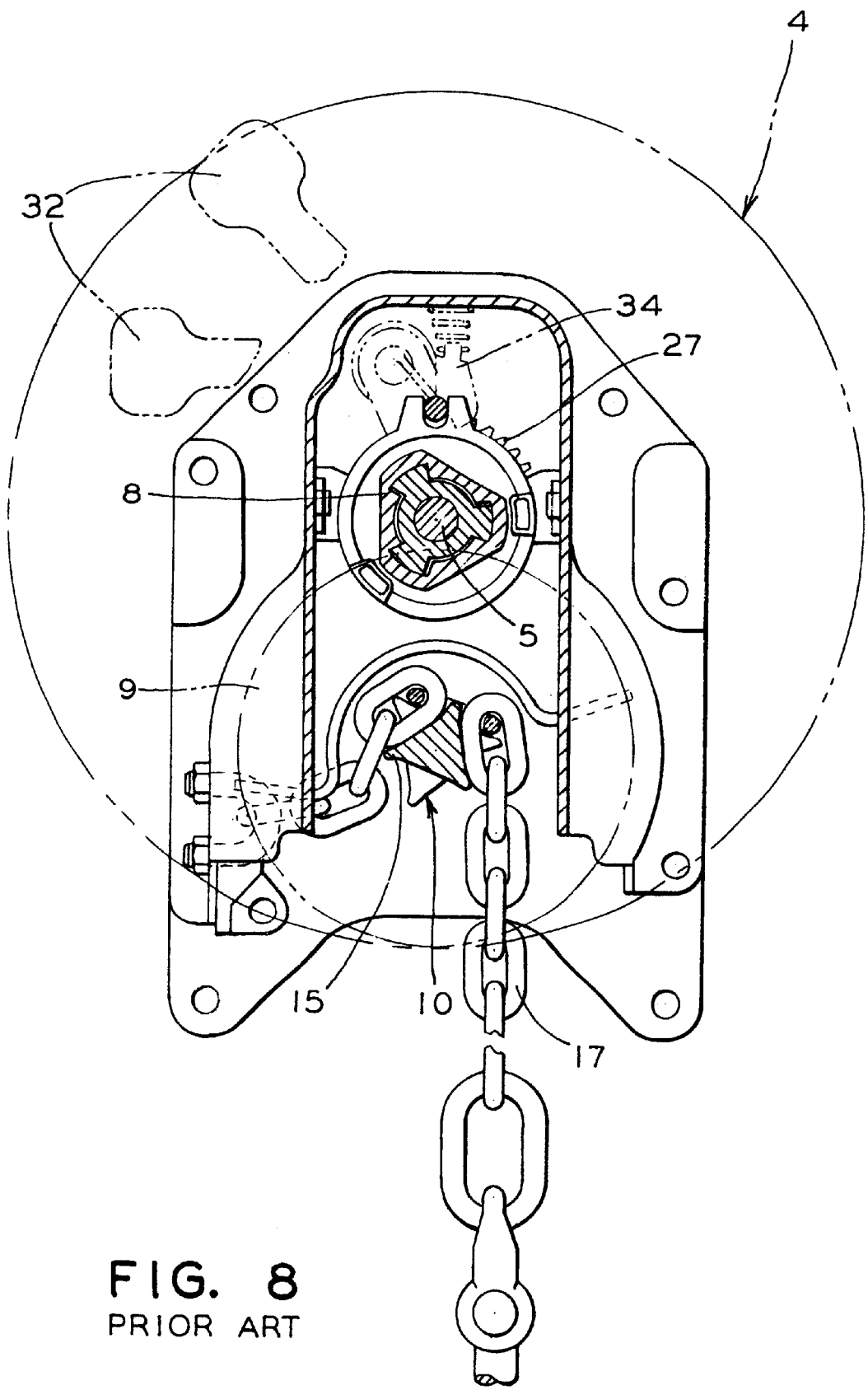
FIG. 8 is an front elevation view, partly in section, of a different type of hand brake device of the prior art within which the fabricated gear of the invention may be used therein.

Although the fabricated gear of the invention has a variety of uses, FIG. 7 shows the use of this gear as one of the components of an automatic set/release hand brake, generally indicated as 100, for a railway vehicle. This type of hand brake system is the subject of co-pending application Ser. No. 09/507,227, entitled "Automatic Application Hand Brake". Another use for the inventive fabricated gear having an antibacklash mechanism is as a replacement for a ratchet and pawl mechanism. Such a replacement can occur for the ratchet 27 and holding pawl 34 in the hand brake as illustrated in FIG. 8. It should be recognized to someone having ordinary skill in the art that the fabricated gear of the invention has many other uses not disclosed herein.

The invention has been described in such full, clear, concise and exact terms so as to enable any person skilled in the art to which it pertains to make and use the same. It should be understood that variations, modifications, equivalents and substitutions for components of the specifically described embodiments of the invention may be made by those skilled in the art without departing from the spirit and scope of the invention as set forth in the appended claims. Persons who possess such skill will also recognize that the foregoing description is merely illustrative and not intended to limit any of the ensuing claims to any particular narrow interpretation.

We claim:

1. A fabricated gear comprising:

(a) a plurality of plates disposed in series one on top of another, each of said plates including a plurality of teeth along an outer circumference thereof;

(b) an aperture extending through a center portion of each of said plates, said aperture forming an inner circumference within each of said plates, said aperture capable of receiving a shaft member therethrough;

(c) means for securing said plates together to form a fabricated gear;

(d) at least one indentation formed within said inner circumference of at least some of said plates, said at least one indentation capable of forming an opening between said inner circumference of said plate and an outer surface of such shaft member; and (e) a cylindrical member capable of interacting with said at least one opening to cause said plates to lock up onto such shaft member upon the application of a force in a first direction and to freely rotate with respect to such shaft member upon the application of a force in a second direction.

2. A fabricated gear as recited in claim 1 wherein said means for securing said plates together includes one of an adhesive, bonding, or brazing material.

3. A fabricated gear as recited in claim 1 wherein said means for securing said plates together includes a mechanical securing means.

4. A fabricated gear as recited in claim 1 further including a key way in each of said plates, said key way being capable of being positioned in alignment with a key way in such shaft member and being capable of receiving a key therein in order to cause said shaft member to rotate in response to a rotational force applied to said fabricated gear.

5. A fabricated gear as recited in claim 1 wherein said opening has a first portion having a first predetermined size and a second portion having a second predetermined size which is greater than said first predetermined size.

6. A fabricated gear as recited in claim 5 wherein said first portion of said opening is smaller in width than a diameter of said cylindrical member such that upon application of said force in said first direction to said plate members, said cylindrical member becomes locked within said first portion of said opening to cause said shaft member to rotate.

7. A fabricated gear as recited in claim 5 wherein said second portion of said opening is greater in width than a diameter of said cylindrical member such that upon application of said force in said second direction to said plate members, said cylindrical member freely rotates within said second portion of said opening to cause said plate members to freely rotate with respect to said shaft member.

8. A fabricated gear as recited in claim 1 including a plurality of indentations within said inner circumference of each of said plates.

9. A fabricated gear keyed onto a shaft member, said fabricated gear comprising:

(a) a plurality of plates disposed in series one on top of another, each of said plates including a plurality of teeth along an outer circumference thereof;

(b) means for securing said plates together to form a fabricated gear;

(c) an aperture extending through a center portion of each of said plates, said aperture forming an inner circumference within each of said plates, said aperture capable of receiving a shaft member therethrough;

(d) a key way provided in each of said plates, said key way being capable of being positioned in alignment with a key way in said shaft member;

(e) a key positioned in said key way of each of said plates and said shaft member so as to cause said shaft member to rotate in response to a rotational force applied to said fabricated gear;

(f) at least one indentation formed within said inner circumference of at least some of said plates, said at least one indentation capable of forming an opening between said inner circumference of said plate and an outer surface of said shaft member; and (g) a cylindrical member capable of interacting with said at least one opening to cause s aid plates to lock up onto said shaft member upon the application of a force in a first direction and to freely rotate with respect to said shaft member upon the application of a force in a second direction.

10. A fabricated gear as recited in claim 9 wherein said means for securing said plates together includes one of an adhesive, bonding, or brazing material.

11. A fabricated gear as recited in claim 9 wherein said means for securing said plates together includes a mechanical securing means.

12. A fabricated gear for use in a hand brake assembly for a railway vehicle, said fabricated gear including an anti-backlash mechanism for one direction rotation of a drive shaft member within said hand brake assembly, said fabricated gear comprising:

(a) a plurality of plates disposed in series one on top of another, each of said plates including a plurality of teeth along an outer circumference thereof;

(b) means for securing said plates together;

(c) an aperture extending through a center portion of each of said plates, said aperture forming an inner circumference within each of said plates, said aperture capable of receiving such shaft member therethrough;

(d) at least one indentation formed within said inner circumference of at least some of said plates, said at least one indentation capable of forming an opening between said inner circumference of said plate and an outer surface of such drive shaft member; and (e) a cylindrical member capable of interacting with said at least one opening to cause said plates to lock up onto said drive shaft member upon the application of a force in a first direction and to freely rotate with respect to said drive shaft member upon the application of a force in a second direction.

13. A fabricated gear as recited in claim 12 wherein said opening has a first portion having a first predetermined size and a second portion having a second predetermined size which is greater than said first predetermined size.

14. A fabricated gear as recited in claim 13 wherein said first portion of said opening is smaller in width than a diameter of said cylindrical member such that upon application of said force in said first direction to said plate members, said cylindrical member becomes locked within said first portion of said opening to cause said drive shaft member to rotate.

15. A fabricated gear as recited in claim 14 wherein said second portion of said opening is greater in width than a diameter of said cylindrical member. such that upon application of said force in said second direction to said plate members, said cylindrical member freely rotates within said second portion of said opening to cause said plate members to freely rotate with respect to said drive shaft member.

16. A fabricated gear as recited in claim 12 including a plurality of indentations within said inner circumference of each of said plates.

17. A fabricated gear as recited in claim 12 wherein said means for securing said plates together includes one of an adhesive, bonding, or brazing material.

18. A fabricated gear as recited in claim 12 wherein said means for securing said plates together includes a mechanical securing means.

* * * * *